Patented Nov. 18, 1952

2,618,020

UNITED STATES PATENT OFFICE 2,618,020

POLY-N-VINYL PYRROLE COMPOUND MOLDING COMPOSITION, MOLDING PROCESS AND PRODUCT

Warren F. Busse and Joseph M. Lambert, Easton, Pa., assignors to General Aniline & Film Corporation, New York, N. Y., a corporation of Delaware No Drawing. Application February 2, 1945, Serial No. 575,928

15 Claims. (Cl. 18—55)

The present invention is directed to an improved molding composition containing N-vinyl polymers and to a method of molding the same and molded articles thus produced.

Polymeric N-vinyl compounds of the type disclosed in United States Patent No. 2,072,465 to Reppe et al., which may be obtained by polymerizing N-vinyl compounds, such as N-vinyl pyrrole, or N-vinyl compounds containing the pyrrole ring, such as, N-vinyl carbazole, N-vinyl tetracarbazole, N-vinyl propylcarbazole, N-vinyl indole and N-vinyl naphthocarbazole, which, in turn, may be produced in the manner disclosed in the United States Patent No. 2,066,160, to Reppe et al., have many unique and valuable properties which render them quite useful in numerous arts. These polymers are particularly useful in the electrical field as a dielectric for low loss insulation since the polymeric N-vinyl compounds have excellent electrical properties, such as very high resistance and low power factor and they retain these good electrical properties up to high temperatures. In addition, these polymeric N-vinyl compounds possess unusually high softening points so that they may be used at higher temperatures than is possible with most other polymeric or resinous compounds.

Due to the chemical structure of such polymeric N-vinyl compounds, it would be expected that molded products made therefrom would have excellent electrical properties and also desirable mechanical properties, such as resistance to heat, good bending strength and elasticity. However, it has been impossible heretofore to produce molded articles having the desired good mechanical properties. It is true that compression molded articles made with powdered polyvinyl carbazole have excellent electrical properties and high mechanical stability to heat but they exhibit very low flexural strength, elasticity and impact resistance. Their mechanical properties can be improved by first fibering the polyvinyl carbazole prior to the molding of the articles as described in United States Patent No. 2,215,573. The polyvinyl carbazole is extruded through a small orifice and stretched in the direction of its length, whereby it is oriented molecularly and converted into fibers which may be comminuted. The thus obtained fibers should be compression molded at temperatures below that at which complete fusion takes place; since, if the temperatures employed during molding are sufficiently high for complete fusion, the orientation of the polyvinyl carbazole molecules in the fiber are destroyed. By careful control of the molding temperature, it is possible to produce, with the use of such fibers, articles having relatively good mechanical properties. However, the temperature range within which such fibers may be molded satisfactorily is very narrow and must be carefully controlled and the products molded to have good mechanical properties, lose their excellent electrical properties on immersion in water.

We have discovered that if a polymeric N-vinyl compound in fibrous form, having a relatively high softening point, is mixed with a non-fibered polymeric N-vinyl compound having a relatively low softening point, the resultant mixture may be molded at a temperature approximating the softening point of the lower melting point constituent of the mixture and a product obtained which possesses good mechanical strength and good electrical properties and which retains its good electrical properties following contact with water. We have further discovered that if molded articles produced from a mixture of such high softening point fibered polymeric N-vinyl compounds and low softening point unfibered polymeric N-vinyl compounds are molded at relatively low temperatures and then given a further heat-treatment, the molded product retains its desirable properties and, in addition, its heat distortion temperature is raised to a temperature approaching the molding temperature.

It is, therefore, an object of the present invention to provide a molding composition comprising polymeric N-vinyl compounds which may be molded at a relatively low temperature yet have a high heat distortion point. A further object is to provide a molding composition comprising polymeric N-vinyl compounds which may be molded over a relatively wide temperature range by either compression or injection molding. And a further object is to provide molded articles of polymeric N-vinyl compounds which combine good mechanical properties with improved heat stability and improved electrical properties. Other and further objects will be apparent as the description progresses.

In practicing the present invention we employ a mixture of a relatively high softening point polymeric N-vinyl compound and a relatively low softening point polymeric N-vinyl compound. As the high softening point constituent of our mixture, we preferably employ fibers of a polymeric N-vinyl compound which have been produced as described in Patent No. 2,185,789 by extruding the polymeric N-vinyl compound and stretching the same in order to orient the molecules in the direction of their length. In order to obtain fibers having desired high softening point, it is preferable to use a relatively high polymerized material. We have found that polymeric N-vinyl compounds having a characteristic viscosity (which will hereinafter be referred to as K value) as defined by H. Fikentscher in the Cellulose Chemie XIII, 58, 1932, in excess of 35 possess a satisfactorily high softening point and are satisfactory for the use of practicing the present invention.

In order to obtain fair mechanical properties by compression molding such fibers of polymeric N-vinyl compound having a K value greater than 35, they must be molded at a temperature and pressure where some fusion of the fibers takes place. This is very close to the temperature at which the orientation of the molecules of the fibers is destroyed and the mechanical properties of the molded articles are impaired. The electrical properties of such molded articles in the dry state may be good but after immersion in water for 30 to 60 hours, the power factor is greatly increased. If lower molding temperatures are used which give the optimum mechanical properties, greatly increased power factor values up to several percent are observed after immersion of the articles which had a power factor below 0.1% when dry. This increase in power factor is evidently due to the porosity of the articles compression molded under these conditions.

We have found that it is possible to overcome this difficulty by mixing a relatively small amount of a low softening point polymeric N-vinyl compound with the fibers. As such low softening point polymer N-vinyl compound which we employ in practicing our invention we may use either a relatively low polymer N-vinyl compound or a more highly polymerized N-vinyl compound whose softening point has been lowered by incorporation therein of a compatible plasticizer.

We have found that suitable relatively low polymer N-vinyl compounds are characterized by a relatively low K value and those having a K value of 35 or lower are satisfactory for use as the low softening point constituent of our molding composition. Under some conditions, we may even use the monomer N-vinyl compounds as the low softening point constituent, if desired, together with suitable inhibitors and catalysts to cause polymerization in the mold.

In place of using such relatively low polymer N-vinyl compounds, as the low softening point constituent of our molding composition, there may be employed a polymeric N-vinyl compound having a K value greater than 25 and preferably 35 or higher which is plasticized by having incorporated therein a small amount of a compatible plasticizer. In general, a sufficient amount of plasticizer is incorporated in the highly polymerized N-vinyl compound to produce a difference of at least 5° C. and preferably 10° C. or more in the softening points of the plasticized and fibered constituents.

Numerous plasticizers are satisfactory for use in this form of our invention. In order to retain the desired electrical properties of the polymeric N-vinyl compound, a hydrocarbon plasticizer is preferably employed. Suitable hydrocarbon plasticizers are phenanthrene, diamyl naphthalene and others. We have found that polymeric N-vinyl compounds which contain a hydrogenated terphenyl derivative as a plasticizer are particularly valuable as plasticizers. When the very highest electrical properties of the molded articles are not so important various polar plasticizers, for instance, tricresyl phosphate, chlorinated diphenyls, dibutylphthalate and the like, may be employed. The plasticizer is generally mixed with the polymeric N-vinyl compounds in relatively small amounts, generally within the range of between 5 to 35%, based on the amount of unfibered material used. When much lower amounts of plasticizer are employed, the softening point of the polymeric N-vinyl compounds is not sufficiently altered for the full advantages of the present invention to be realized. In general, the use of over 35% of plasticizer is unnecessary and results in lowering the softening point of the finished molded article. The exact amount of plasticizer will be determined, however, in a large extent by the softening point of the polymer to which it is added and the melting point desired in the plasticized polymer. In general, the higher the softening point of the polymer the greater the amount of plasticizer which must be added.

The exact amounts of relatively high softening point polymer and low softening point polymer which will be used in practicing the present invention may be varied through a relatively wide range. Thus, the exact proportion will depend on the properties desired in the finished molded article and also on the molding procedure which is to be followed and on the specific properties of the two types of polymers which are mixed. As a general rule, at least 5% of relatively low softening point polymer should be present in the molding composition in order to produce molded articles which retain their desired electrical properties after immersion. The preferred amount of low softening point polymer is generally within the range of 10 to 75% and preferably 15 to 35% in case the articles are to be molded by compression molding. In the event that injection molding is to be employed, the low softening point polymer may constitute a relatively greater amount of the molding composition, while still retaining many of the benefits of the present invention. It should be understood that the relative amounts as specified above, refer only to the polymeric N-vinyl compound content of the composition. Various inert fillers such as diatomaceous earth, silica powder and the like may be incorporated in the molding composition for specific purposes. The presence of relatively large amounts of such inert fillers does not affect the principles of this invention.

For the production of articles having a particularly high heat distortion temperature, we preferably employ, as the low softening point constituent, a polymeric N-vinyl compound having a relatively high K value, 35 or greater, plasticized by a minor amount, generally 5–10%, of a compatible high boiling point plasticizer and some 15 to 35% of this low softening point plasticized polymer is incorporated with 85 to 65% of fibered polymeric N-vinyl compound having a K value greater than 35. The molded articles produced from such compositions by compression molding at temperatures above the softening point of the low softening point constituent but below the softening point of the high softening point constituent possess high temperature stability and excellent electrical properties which are retained even after water immersion. For the production of molded articles having somewhat lower heat distortion points more highly plasticized polymeric N-vinyl compounds may be employed, e. g., a polymeric N-vinyl compound having a K value greater than 35 mixed with 10 to 30% of a compatible plasticizer.

As heretofore indicated, when one of the constituents is highly plasticized, and the sample is molded at a relatively low temperature, the heat distortion point of the molded article may be raised by heat-treatment of the molded article at a temperature above that at which it was molded. We have found that after molding at high pressures to give a compact structure, the fibers of the high softening point polymeric N-vinyl compounds which form the major part of the molding composition employed in practicing our invention give sufficient rigidity to the molded article so that it can be removed from the mold at temperatures only slightly lower than the molding temperature. The article is then preferably placed in any suitable heat stable form and heated to a temperature above that at which it was molded but below the temperature at which the orientation of the fibers in the polymeric N-vinyl compound would be destroyed. In general, for this type of composition, heat-treatment at a temperature of 20 to 50° C. higher than molding temperature for three to four hours effected about the maximum improvement in the heat distortion point of the molded article. This procedure shortens considerably the length of the molding cycle and makes compression molding more practical and economical.

The present invention will be more fully understood from the following specific examples of the molding compounds of the present invention and their use in the practice thereof. The parts are by weight.

*Example 1*

Fibered polyvinyl carbazole extruded at 260° C. (ground to pass through 4 or 10 mesh) _____ 75
Powdered polyvinyl carbazole (−35 mesh) _____ 95
Hydrogenated terphenyl derivative (e. g., Monsanto's HB–40 oil) _____ 5    25
                                                                              ———
                                                                              100

We have found that this compound can be compression molded at temperatures between 200 and 240° C., at pressures from 3000 to 5000 lbs./in.² The shaped articles have good machining properties and excellent electrical properties also after water immersion. Some of the mechanical data obtained are herewith presented:

Heat distortion point _____ 140–160° C.
Coefficient of thermal expansion ___ 4 to 5×10⁻⁵
Specific gravity _____ 1.2
Flexural strength ___ 4500–5500 lbs./in.²
Impact strength ___ 0.5–1.0 ft. lb./in. of notch

*Example 2*

Fibered polyvinyl carbazole extruded at 260° C. (ground to pass through 4 or 10 mesh) _____ 75
Powdered polyvinyl carbazole (−35 mesh) _____ 90
Phenanthrene _____ 10    25
                                                                              ———
                                                                              100

This compound has similar properties as given for Example 1, using a solid plasticizer for the powder component.

*Example 3*

Fibered polyvinyl carbazole extruded at 260° C. (ground to pass through 4 or 10 mesh) _____ 75
Powdered polyvinyl carbazole (−35 mesh) _____ 85
Hydrogenated terphenyl derivative (e. g., Monsanto's HB–40 oil) _____ 15    25
                                                                              ———
                                                                              100

We have found that this compound can be molded at temperatures below 200° C. giving shaped articles of excellent mechanical and electrical properties. The power factor at 1 mc. was found to be below 0.3% after 69 hours water immersion for any molding temperature above 160° C.

*Example 4*

Fibered polyvinyl carbazole extruded at 260° C. (ground to pass through 4 or 10 mesh) _____ 50
Powdered polyvinyl carbazole (−35 mesh) _____ 80
Hydrogenated terphenyl derivative (e. g., Monsanto's HB–40 oil) _____ 20    50
                                                                              ———
                                                                              100

This material can be injection molded at temperatures of about 180° to 220° C. It is also suitable for compression molding below 130° C. Subsequent heat treatment raised the heat distortion to about 100° C.

*Example 5*

Fibered polyvinyl carbazole extruded at 260° C. (ground to pass through 4 or 10 mesh) _____ 70
Powdered polyvinyl carbazole (−35 mesh) _____ 67
Hydrogenated terphenyl derivative (e. g., Monsanto's HB–40 oil) _____ 33    30
                                                                              ———
                                                                              100

This compound was found to be especially suited for low molding temperatures and can be used on steam heated equipment. Articles molded at 150° C. exhibit good fusion after using the usual compression molding cycle with cooling to only 20–30° C. below the molding temperature. Subsequent heat treatment for two hours at above 170° C. raised the heat distortion of such articles to above 100° C.

*Example 6*

Fibered polyvinyl carbazole extruded at 260° C. (ground to pass through 4 or 10 mesh) _____ 80
Powdered polyvinyl carbazole (−35 mesh) _____ 80
Hydrogenated terphenyl derivative (e. g., Monsanto's HB–40 oil) _____ 20    20
                                                                              ———
                                                                              100

We have found that articles of low density can be obtained by molding this compound at temperatures from 120 to 150° C. at suitably low pressures. Specimens can be obtained having densities as low as 0.6 compared to a density of 1.2 for solid polyvinyl carbazole moldings. Articles thus prepared have a lower dielectric constant which varies according to the density and can be obtained as low as 2. Solid polyvinyl carbazole moldings have a dielectric constant of 3. Subsequent heat treatment of the formed specimens for 4 hours at 150° C. raised the heat distortion point to 120° C.

Example 7

| | |
|---|---|
| Mineral filler (e. g., Foote minerals silica powder —100 mesh) | 50 |
| Compound described under Example 6 | 50 |
| | 100 |

This compound exhibits rather good mechanical properties and a thermal expansion coefficient below $4 \times 10^{-5}$. This lower expansion coefficient is important for applications requiring metal inserts and articles of high thermal stability.

Example 8

| | |
|---|---|
| Chlorinated diphenyl (e. g., Monsanto's Aroclor 1270) | 30 |
| Compound described under Example 1 | 70 |
| | 100 |

Articles made of this compound have fair mechanical properties and are flameproof, i. e., they will burn but will not sustain burning when the flame is removed.

Example 9

| | |
|---|---|
| Fibered polyvinyl carbazole extruded at 260° C. (ground to pass through 4 or 10 mesh) | 85 |
| N-vinyl carbazole crystals containing 1% morpholine | 15 |
| | 100 |

This mixture could be compression molded at temperatures and time to polymerize the monomer. For most purposes, the best results are obtained with a relatively low rate of polymerization. At 120° C., the monomer was completely polymerized in 12 hours, while at 130° C., from 4 to 6 hours were required for complete polymerization. Higher temperatures, which are still below the softening point of the fibered polyvinyl carbazole, may be used with a corresponding decrease in the time required for polymerization. After complete polymerization of the monomer at a relatively low temperature, the heat distortion of the molded article is improved by treatment at a higher temperature which is still below the softening point of the fibered constituent.

Example 10

| | |
|---|---|
| Fibered polyvinyl carbazole extruded at 260° C. (ground to pass through 4 or 10 mesh) | 75 |
| Low polymer of vinyl carbazole (K value 30, softening point 175° C.) | 25 |
| | 100 |

This compound can be compression molded at temperatures of 200 to 240° C. to form shaped articles having good electrical and mechanical properties.

We claim:

1. The method of producing moldings of polymeric N-vinyl pyrrole compounds consisting of fibers of said polymeric N-vinyl pyrrole compounds cemented together by an unfibered polymeric N-vinyl pyrrole composition, said moldings having a power factor after water immersion substantially equal to their power factor before such immersion, which comprises mixing molecularly-oriented fibers of a high polymer of an N-vinyl pyrrole compound having a high softening point with from 10–75% of an unfibered finely-divided relatively low softening point N-vinyl pyrrole compound having a softening point at least 5° C. below the softening point of said high softening point material and selected from the group consisting of monomeric polymerizable N-vinyl pyrrole compounds, low polymers of N-vinyl pyrrole compounds and high polymers of N-vinyl pyrrole compounds containing from 5–35% of a compatible plasticizer having a low softening point so as to form a mechanical mixture in which said fibers of said high softening point material retain their individual identity, and subjecting the thus-obtained mixture to a molding operation under pressure at a temperature between the softening points of said low softening point constituent and said high softening point constituent, whereby said particles of said high softening point material are not substantially altered in said molding operation and a molded article having the properties specified is obtained.

2. In a method as defined in claim 1, the improvement which comprises heating the thus-produced molding to a higher temperature than that employed during the molding operation specified, but which is still below the softening point of the said fibered polymeric N-vinyl pyrrole compound, whereby the heat distortion point of said molding is raised.

3. The method as defined in claim 1 wherein the molecularly-oriented fibers of a high fibered N-vinyl pyrrole specified are molecularly oriented fibers of a high polymer of N-vinyl carbazole having a high softening point and a K valve greater than 35; and wherein the lower softening point material specified is a plasticized polyvinyl carbazole having a characteristic viscosity greater than 25 and containing from 5–35% of a compatible plasticizer having a low softening point.

4. The method as defined in claim 1 wherein the molecularly-oriented fibers of a high fibered N-vinyl pyrrole specified are molecularly oriented fibers of a high polymer of N-vinyl carbazole having a high softening point and a K value greater than 35; and wherein the lower softening point material specified is a low polymer of N-vinyl carbazole having a characteristic viscosity less than 25.

5. In a method as defined in claim 4, the improvement which comprises heating the thus produced molding to a higher temperature than that employed during the molding operation specified but which is still below the softening point of said fibered polymeric N-vinyl carbazole whereby the heat distortion point of said molding is raised.

6. In a method as defined in claim 3, the improvement which comprises heating the thus-produced molding to a higher temperature than that employed during the molding operation specified, but which is still below the softening point of the said fibered polymeric N-vinyl carbazole compound, whereby the heat distortion point of said molding is raised.

7. A molding composition adapted for the production of moldings, having a power factor after water immersion substantially equal to its power factor before such immersion, and consisting of fibers of polymeric N-vinyl pyrrole compounds cemented together by an unfibered polymeric N-vinyl pyrrole composition, which consists of an intimate mechanical mixture of molecularly-oriented fibers of a high polymer of an N-vinyl pyrrole compound having a high softening point and from 10–75% by weight of a low softening point unfibered finely-divided N-vinyl pyrrole composition having a softening point at least 5° C. below the softening point of said high softening point material and selected from the class consisting of monomeric polymerizable N-vinyl pyrrole compounds, low polymers of N-vinyl pyrrole compounds and high polymers of N-vinyl pyrrole compounds containing from 5–35% by weight of a compatible plasticizer having a low softening point, said fibers of said high softening point material retaining their individual identity in said mixture.

8. The method as defined in claim 1 wherein the molecularly-oriented fibers of a high fibered N-vinyl pyrrole specified are molecularly-oriented fibers of a high polymer of an N-vinyl carbazole having a high softening point and a K value greater than 35; and wherein the lower softening point material specified is a monomeric N-vinyl carbazole.

9. In a method as defined in claim 8 the improvement which comprises heating the thus produced molding to a higher temperature than that employed during the molding operation specified but which is still below the softening point of said fibered polymeric N-vinyl carbazole whereby the heat distortion point of said molding is raised.

10. A molding composition as defined in claim 7 wherein the molecularly oriented fibers of a high polymer of an N-vinyl pyrrole specified are the molecularly oriented fibers of a high polymer of N-vinyl carbazole having a high softening point and a K value greater than 35; and wherein the low softening point material specified constitutes from 15–35% by weight of the total composition and is a plasticized polyvinyl carbazole having a K value greater than 25 containing from 5–35% by weight of a compatible plasticizer having a low softening point.

11. A molding composition as defined in claim 7 wherein the molecularly oriented fibers of a high polymer of an N-vinyl pyrrole specified are the molecularly oriented fibers of a high polymer of N-vinyl carbazole having a high softening point and a K value greater than 35; and wherein the low softening point material specified constitutes from 15–35% by weight of the total composition and is a low polymer of N-vinyl carbazole having a K value less than 25.

12. A molding composition as defined in claim 7 wherein the molecularly oriented fibers of a high polymer of an N-vinyl pyrrole specified are the molecularly oriented fibers of a high polymer of N-vinyl carbazole having a high softening point and a K value greater than 35 and wherein the low softening point material specified constitutes from 15–35% by weight of the total composition and is monomeric N-vinyl carbazole.

13. A molded article having a power factor after water immersion substantially equal to its power factor before such immersion, said article consisting of molecularly oriented fibers of polymeric N-vinyl pyrrole compound in an amount equal to 90–25% of the weight of said article, said fibers being cemented together by a polymeric-N-vinyl pyrrole composition having a softening point at least 5° C. below the softening point of said molecularly oriented fibers and selected from the class of low polymers of N-vinyl pyrrole compounds and high polymers of N-vinyl pyrrole compounds containing from 5–35% by weight of a compatible plasticizer having a low softening point, said poly-N-vinyl pyrrole cementing composition forming the balance of said article.

14. A molded article as defined in claim 13 wherein the molecularly oriented fibers of polymeric N-vinyl pyrrole compound specified are molecularly oriented fibers of poly-N-vinyl carbazole having a K value greater than 35 and constitutes from 85–65% by weight of said article and the low softening point material specified is a plasticized polyvinyl carbazole having a K value greater than 25 containing from 5–35% by weight of a compatible plasticizer having a low softening point.

15. A molded article as defined in claim 13 wherein the molecularly oriented fibers of polymeric N-vinyl pyrrole compound specified are molecularly oriented fibers of poly-N-vinyl carbazole having a K value greater than 35 and constitutes from 85–65% by weight of said article; and the low softening point material specified is a low polymer of N-vinyl carbazole having a K value less than 25.

WARREN F. BUSSE.
JOSEPH M. LAMBERT.

REFERENCES CITED

The following references are of record in the file of this patent:

UNITED STATES PATENTS

| Number | Name | Date |
|---|---|---|
| 1,997,489 | Herrman et al. | Apr. 9, 1935 |
| 2,072,465 | Reppe et al. | Mar. 2, 1937 |
| 2,211,429 | Mueller-Cunradi et al. | Aug. 13, 1940 |
| 2,215,573 | Beck et al. | Sept. 24, 1940 |
| 2,234,993 | Vernon et al. | Mar. 18, 1941 |
| 2,327,128 | Renfrew et al. | Aug. 17, 1943 |
| 2,357,392 | Francis | Sept. 5, 1944 |
| 2,431,303 | Billmeyer | Nov. 25, 1947 |

FOREIGN PATENTS

| Number | Country | Date |
|---|---|---|
| 484,343 | Great Britain | May 4, 1938 |

OTHER REFERENCES

DeBell et al., German Plastics Practice, pages 518–519 published by DeBell and Richardson, Springfield, Mass., 1946.